United States Patent
Okazaki et al.

(10) Patent No.: US 10,599,371 B2
(45) Date of Patent: Mar. 24, 2020

(54) IMAGE FORMING APPARATUS

(71) Applicant: KYOCERA Document Solutions Inc., Osaka (JP)

(72) Inventors: Yusuke Okazaki, Osaka (JP); Akira Ohashi, Osaka (JP); Yukihiro Shibata, Osaka (JP); Satoshi Sato, Osaka (JP); Yuki Yamamoto, Osaka (JP); Koji Tagaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/387,105

(22) Filed: Apr. 17, 2019

(65) Prior Publication Data

US 2019/0324697 A1    Oct. 24, 2019

(30) Foreign Application Priority Data

Apr. 23, 2018    (JP) .................................. 2018-082388

(51) Int. Cl.
    *G06F 3/12*    (2006.01)
(52) U.S. Cl.
    CPC .......... *G06F 3/1221* (2013.01); *G06F 3/1205* (2013.01); *G06F 3/1279* (2013.01)
(58) Field of Classification Search
    CPC ..... G06F 3/1221; G06F 3/1279; G06F 3/1205
    See application file for complete search history.

(56) References Cited

U.S. PATENT DOCUMENTS

| | | | |
|---|---|---|---|
| 2011/0004776 A1 | 1/2011 | Tanaka | |
| 2015/0264210 A1* | 9/2015 | Ono | H04N 1/00904 358/1.13 |
| 2018/0101210 A1* | 4/2018 | Fukui | G06F 3/1229 |
| 2018/0176404 A1* | 6/2018 | Onishi | G06F 3/1221 |

FOREIGN PATENT DOCUMENTS

| | | |
|---|---|---|
| EP | 2527924 A1 | 11/2012 |
| EP | 2827195 A1 | 1/2015 |
| JP | 2002-006686 A | 1/2002 |

OTHER PUBLICATIONS

The extended European search report issued by the European Patent Office dated Sep. 16, 2019, which corresponds to EP19169807.5-1022 and is related to U.S. Appl. No. 16/387,105.

* cited by examiner

*Primary Examiner* — Neil R McLean
(74) *Attorney, Agent, or Firm* — Studebaker & Brackett PC

(57) ABSTRACT

An image forming apparatus operates in a normal mode in a first electric power state and in a power saving mode in which more electric power is saved than in the first electric power state. The image forming apparatus includes a motion sensor, an operation section, and a controller. The controller executes a first timer process in response to receipt of the detection signal and executes a second timer process in response to receipt of the operation signal. At a time when a first period elapses indicating that the first timer process times out, the controller transitions from the normal mode to the power saving mode. At a time when a second period elapses indicating that the second timer process times out, the controller transitions from the normal mode to the power saving mode. The first period is shorter than the second period.

6 Claims, 9 Drawing Sheets

| Operation event | Stoppage of first timer Yes: Stop    No: Not stop |
|---|---|
| Pressing of key | Yes |
| Touching on touch panel | Yes |
| Touching by IC card | Yes |
| Coin dropping in a vending machine | Yes |
| Setting of document | Yes |
| Opening/closing of document mat | Yes |
| Fitting of network cable | No |
| Network job (printing and box storage) | No |
| Insertion/removal of USB memory | No |
| Attachment/detachment of sheet cassette | No |
| Opening/closing of caver restricting access to toner container | No |
| Detection by motion sensor | No |

| Operation event | Stoppage of first timer<br>Yes: Stop    No: Not stop |
|---|---|
| Pressing of key | Yes |
| Touching on touch panel | Yes |
| Touching by IC card | Yes |
| Coin dropping in a vending machine | Yes |
| Setting of document | Yes |
| Opening/closing of document mat | Yes |
| Fitting of network cable | No |
| Network job (printing and box storage) | No |
| Insertion/removal of USB memory | No |
| Attachment/detachment of sheet cassette | No |
| Opening/closing of caver restricting access to toner container | No |
| Detection by motion sensor | No |

FIG. 9

IMAGE FORMING APPARATUS

INCORPORATION BY REFERENCE

The present application claims priority under 35 U.S.C. § 119 to Japanese Patent Application No. 2018-082388, filed on Apr. 23, 2018. The contents of this application are incorporated herein by reference in their entirety.

BACKGROUND

The present disclosure relates to an image forming apparatus.

In recent years, image forming apparatuses and printers have a function of setting a power saving state (also referred to below as a power saving mode) by for example turning off a power source for some devices therein in order to reduce electric power consumption. However, in a situation in which a user uses such an image forming apparatus in the power saving mode, the user needs to release the power saving mode through manual touch panel input or manual key input. In order to save the user the burden of such a release operation, the following technique using a motion sensor has been proposed. In an image forming apparatus, when a sensor including a pyroelectric sensor and a plurality of lenses detects a user approaching the image forming apparatus, the mode of the image forming apparatus reverts to a normal mode from the power saving mode through release of the power saving mode.

SUMMARY

An image forming apparatus according to an aspect of the present disclosure operates in a normal mode in a first electric power state and a power saving mode in a second electric power state. More electric power is saved in the second electric power state than in the first electric power state. The image forming apparatus includes a sensor, an operation section, and a controller. The sensor detects a detection target to generate a detection signal indicating detection of the detection target. The operation section receives an operation from the detection target to generate an operation signal indicating content of the operation from the detection target. The controller executes a first timer process in response to receipt of the detection signal from the sensor and executes a second timer process in response to receipt of the operation signal from the operation section. The first timer process is a process of measuring an elapsed period from receipt of the detection signal from the sensor by the controller. The second timer process is a process of measuring an elapsed period from stoppage of receipt of the operation signal from the operation section by the controller. At a time when a first period elapses indicating that the first timer process times out, the controller transitions from the normal mode to the power saving mode. At a time when a second period elapses indicating that the second timer process times out, the controller transitions from the normal mode to the power saving mode. The first period is shorter than the second period.

BRIEF DESCRIPTION OF THE DRAWINGS

FIG. 9 is a table indicating a relationship between operation events and stoppage of a first timer process.

DETAILED DESCRIPTION

Figure 1:
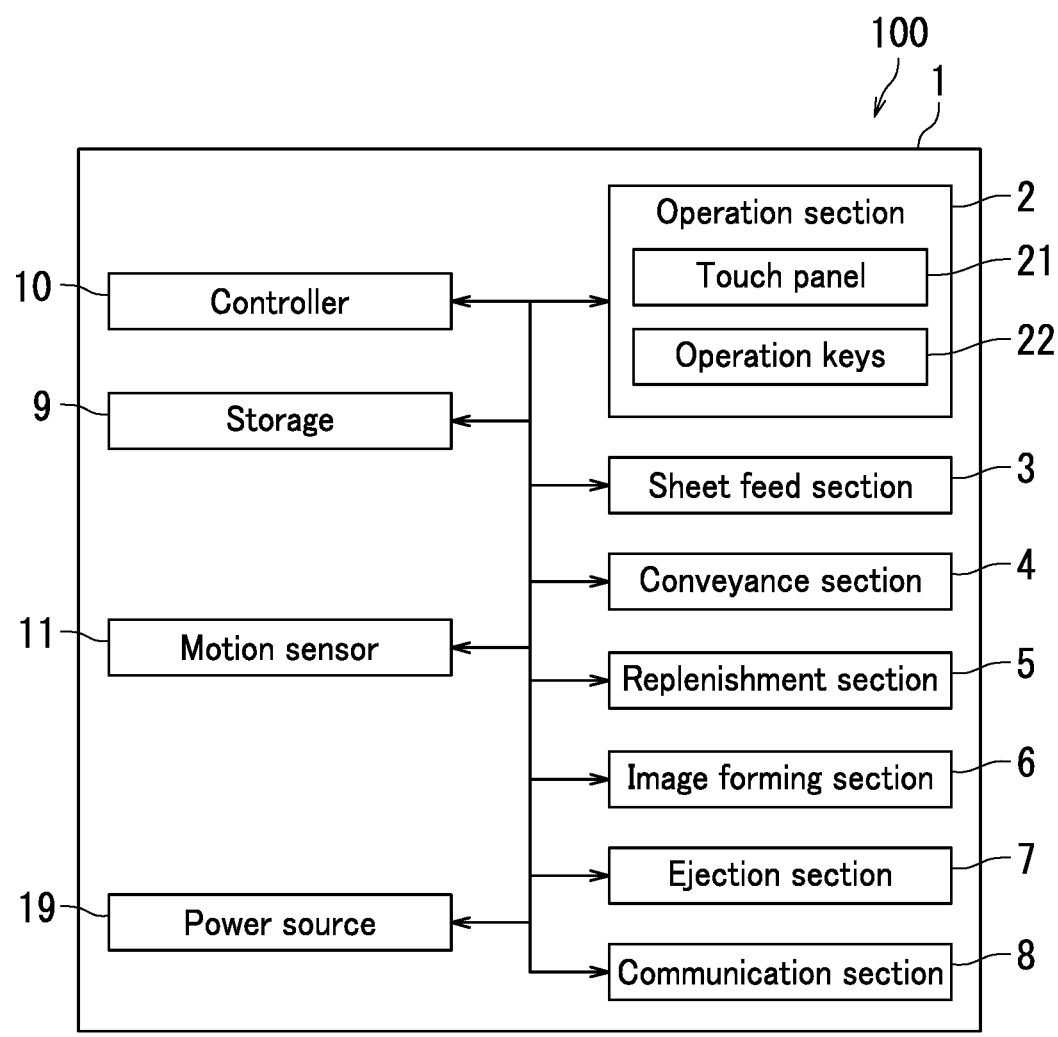
FIG. 1 is a block diagram illustrating a configuration of an image forming apparatus according to an embodiment of the present disclosure.

The following describes an image forming apparatus according to an embodiment of the present disclosure with reference to the accompanying drawings. It should be noted that elements in the drawings that are the same or equivalent are labelled using the same reference signs and description thereof is not repeated.

A configuration of an image forming apparatus 100 according to the present embodiment will be described with reference to FIG. 1. FIG. 1 is a diagram illustrating the configuration of the image forming apparatus 100. The image forming apparatus 100 forms images in the present embodiment.

The image forming apparatus 100 operates in either a normal mode in a first electric power state or a power saving mode in a second electric power state. The second electric power state is a state in which more electric power is saved than in the first electric power state. The image forming apparatus 100 includes a motion sensor 11, an operation section 2, a communication section 8, and a controller 10.

The motion sensor 11 detects a user who is a detection target to generate a detection signal indicating detection of the user in a detection range. The motion sensor 11 functions as a sensor in the present embodiment. Specifically, the motion sensor 11 generates a detection signal indicating that a user has been detected in the detection range upon detection of the user and a detection signal indicating that the user has not been detected therein upon non-detection of the user therein. In other words, the motion sensor 11 does not generate a detection signal indicating a user approaching or leaving the image forming apparatus 100 in the detection range. A motion sensor capable of generating a detection signal indicating a user approaching or leaving the image forming apparatus 100 in the detection range is called a "high-performance motion sensor". By contrast, a motion sensor that generates a detection signal indicating that a user has been detected in a specific range or the user has not been detected therein is called a "low-performance motion sensor".

The operation section 2 receives an operation from the user to generate an operation signal indicating content of the user operation. The operation section 2 generates an operation signal while the user is performing the operation. The operation section 2 does not generate an operation signal while the user is not performing an operation.

The operation section 2 includes a touch panel 21 and a plurality of operation keys 22. The touch panel 21 includes a display and a touch sensor.

The display displays various screens. The various screens include a standby screen and a service screen. The standby screen includes for example menu buttons for instructing to execute various processes. The service screen is for example a screen for changing a setting of the image forming apparatus 100. The display is for example a liquid-crystal display or an organic electroluminescent (EL) display.

The touch sensor detects a touch by a detection target. The touch sensor outputs a position signal indicating a position where the touch by the detection target is detected. The detection target is for example a finger of the user. The touch sensor is for example a resistive touch sensor. The operation keys 22 include for example a numeric keypad, a start key, and a cancel key.

The communication section 8 is capable of communicating with an electronic device equipped with a communication device that uses the same communication method (protocol) as the communication section 8.

The controller 10 transitions from the power saving mode to the normal mode in response to receipt of the detection signal. Thus, the power saving mode can be released through use of the low-performance motion sensor according to the present disclosure. For example, the image forming apparatus 100 may be installed on a hallway along which a person walks. In a situation as above, the motion sensor 11 does not detect the user approaching the image forming apparatus 100. Therefore, the controller 10 accordingly executes a first timer process and a second timer process. Specifically, the controller 10 executes the first timer process in response to receipt of the detection signal and the second timer process in response to receipt of the operation signal. The first timer process is a process of measuring an elapsed period that starts after receipt of the detection signal. The second timer process is a process of measuring an elapsed period that starts after receipt of the operation signal. The controller 10 includes a first timer tt1 and a second timer tt2. The first timer tt1 indicates a time measured in the first timer process in units of seconds. The second timer tt2 indicates a time measured in the second timer process in units of seconds. The controller 10 includes a processor such as a central processing unit (CPU).

The controller 10 further includes an integrated circuit for image formation processing. The integrated circuit for image formation processing is for example constituted by an application-specific integrated circuit (ASIC). The controller 10 controls each section of the image forming apparatus 100 by executing a control program.

The image forming apparatus 100 transitions from the normal mode to the power saving mode at a time when a first period elapses, indicating that the first timer process times out. The image forming apparatus 100 transitions from the normal mode to the power saving mode at a time when a second period elapses, indicating that the second timer process times out. The first period is shorter than the second period.

Duration until the first timer process, which starts time measurement upon detection of the user, times out is shorter than duration until the second timer process, which starts time measurement upon completion of an operation by the user, times out. As a result of provision of the above difference in duration until timeout, the image forming apparatus 100 can transition from the normal mode to the power saving mode within a shorter period in a situation in which the user passes by the image forming apparatus 100 without performing any operation thereon than in a situation in which the user performs an operation thereon. As a consequence, a power saving time can be prolonged even in a configuration in which the power saving mode is released through use of the low-performance motion sensor.

The image forming apparatus 100 further includes a casing 1, a sheet feed section 3, a conveyance section 4, a replenishment section 5, an image forming section 6, an ejection section 7, storage 9, and a power source 19. The image forming apparatus 100 forms monochrome images in the present embodiment.

The sheet feed section 3 accommodates a plurality of sheets S and feeds the accommodated sheets S one at a time.

The conveyance section 4 conveys the fed sheet S to the ejection section 7.

The replenishment section 5 replenishes the image forming section 6 with a consumable. The consumable is toner in the present embodiment.

The image forming section 6 executes an image formation process. Specifically, the image forming section 6 forms an image (toner image) on the sheet S with the consumable. In the present embodiment, the image forming section 6 includes the following unillustrated elements: a light exposure device, a charger, a photosensitive drum, a development device, a cleaner, a transfer device, and a fixing device. The image forming section 6 forms images by electrophotography.

The ejection section 7 ejects the sheet S with the toner image fixed thereto onto an exit tray out of the casing 1 through a sheet exit port.

The storage 9 stores various data therein. The storage 9 includes a storage device and semiconductor memory. The storage device includes for example either or both a hard disk drive (HDD) and a solid-state drive (SSD). The semiconductor memory includes for example random-access memory (RAM) and read-only memory (ROM). The storage 9 stores the control program therein.

The power source 19 supplies electric power to at least some elements of the image forming apparatus 100.

The following describes operating states of the controller 10 with reference to FIGS. 1 to 4. The controller 10 in the present embodiment transitions to various operating states according to receipt of the detection signal from the motion sensor 11 and the operation signal from the operation section 2.

Figure 2:
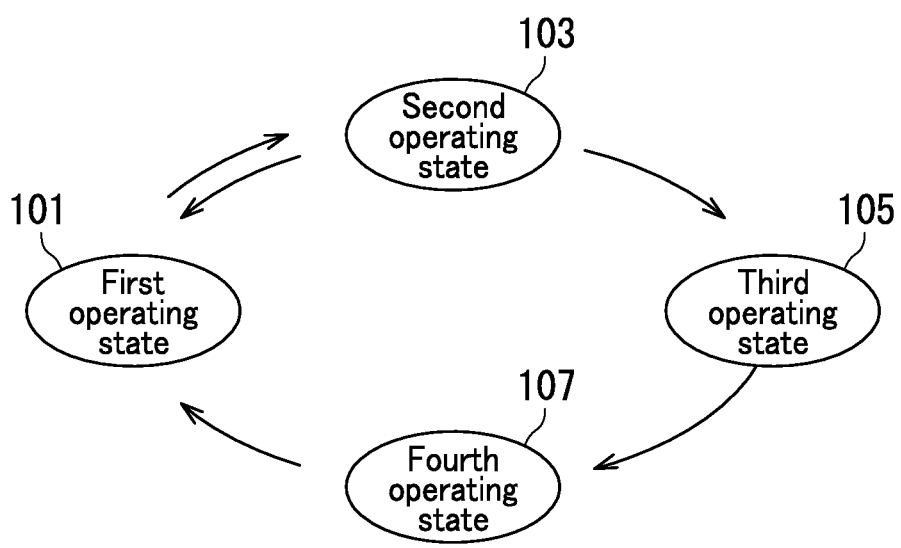
FIG. 2 is a diagram explaining transition of an operating state of a controller.

Operating state transition of the controller 10 will be described first with reference to FIGS. 1 and 2. FIG. 2 is a diagram explaining types of the operating states of the controller 10. For example, the operating states include a first operating state 101, a second operating state 103, a third operating state 105, and a fourth operating state 107. The first operating state 101 corresponds to the power saving mode. The second operating state 103 corresponds to the normal mode. The third operating state 105 corresponds to the normal mode. The fourth operating state 107 corresponds to the normal mode.

When the motion sensor 11 generates the detection signal upon detection of the user in a state in which the controller 10 is in the first operating state 101, the controller 10 receives the detection signal from the motion sensor 11 to transition to the second operating state 103. The controller 10 executes the first timer process in response to receipt of the detection signal from the motion sensor 11. Upon timeout of the first timer process executed by the controller 10 in a state in which the controller 10 is in the second operating state 103, the controller 10 transitions to the first operating state 101. When the first period elapses, the controller 10 terminates the first timer process.

Upon receipt of the operation signal in a state in which the controller 10 is in the second operating state 103, the controller 10 transitions to the third operating state 105.

When receipt of the operation single stops due to the user stopping operation of the operation section 2 in a state in which the controller 10 is in the third operating state 105, the controller 10 acknowledges stoppage of the operation signal to transition to the fourth operating state 107. The controller 10 starts the second timer process.

Upon timeout of the second timer process in a state in which the controller 10 is in the fourth operating state 107, the controller 10 transitions to the first operating state 101. The controller 10 seamlessly performs transition between the two operation modes (normal mode and power saving mode) based on the two types of signals (detection signal and operation signal), the two types of timers (first timer tt1 and second timer tt2), and the four types of operating states while taking account of balance between power saving and convenience of shortening wait time for the user.

Figure 3:
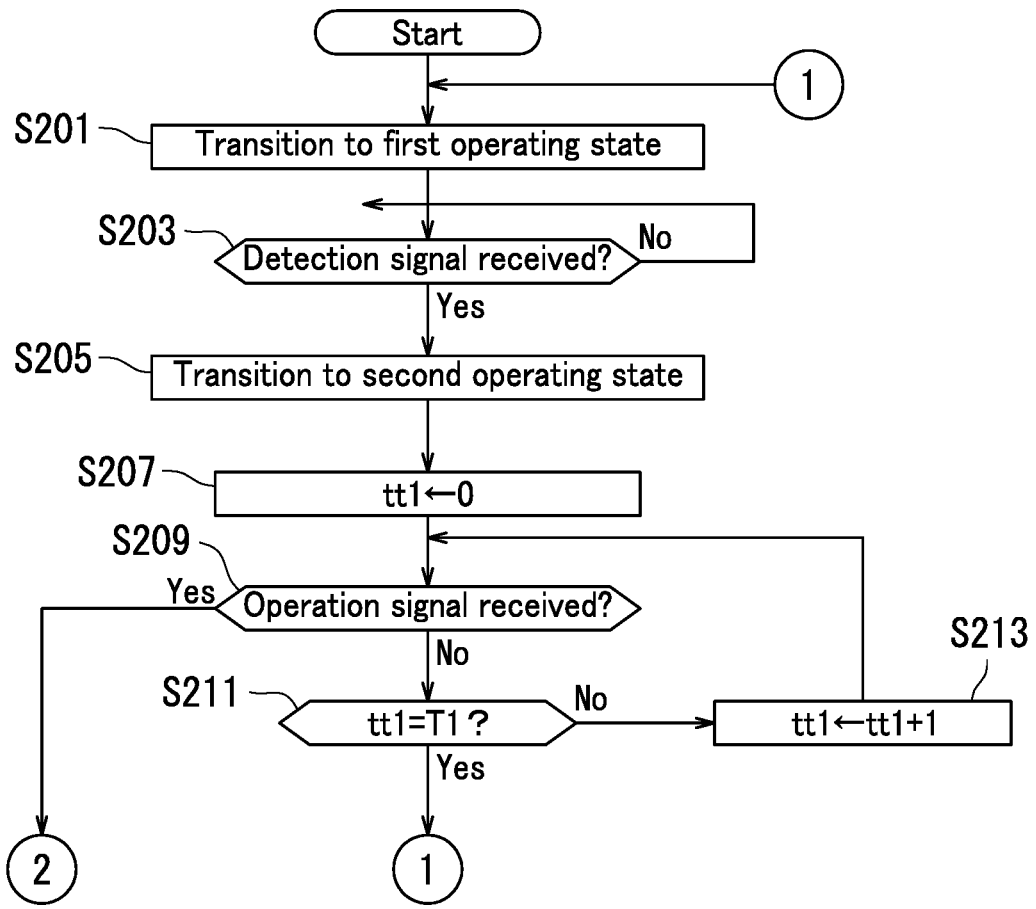
FIG. 3 is a flowchart depicting a process performed by the controller.

The following describes operating state transition in the controller 10 with reference to FIGS. 1 to 4. FIG. 3 is a flowchart depicting operating state transition in the controller 10. Operating state transition in the controller 10 starts for example once the power source 19 is turned on in the present embodiment.

Step S201: The controller 10 transitions to the first operating state 101.

Step S203: The controller 10 determines whether or not the detection signal from the motion sensor 11 has been received. When the detection signal from the motion sensor 11 has been received (Yes in Step S203), the routine proceeds to Step S205. When the detection signal from the motion sensor 11 has not been received (No in Step S203), the routine remains in Step S203.

Step S205: The controller 10 transitions from the first operating state 101 to the second operating state 103.

Step S207: The controller 10 resets the first timer tt1 and starts time measurement.

Step S209: The controller 10 determines presence or absence of the operation signal from the operation section 2. When the detection signal from the operation section 2 is present (Yes in Step S209), the routine proceeds to Step S215 in FIG. 4. When the operation signal from the operation section 2 is absent (No in Step S209), the routine proceeds to Step S211.

Step S211: When the value of the first timer tt1 reaches the first period, i.e., an elapsed period T1 (Yes in Step S211), the routine returns to Step S201. When the value of the first timer tt1 does not reach the first period (No in Step S211), the routine proceeds to Step S213. The first period is for example 180 seconds.

Step S213: The controller 10 performs counting-up on the first timer tt1 and the routine returns to Step S209. The first timer tt1 and the second timer tt2 measure by seconds in the present embodiment. The term counting-up means addition of one second in the respective timer processes.

Figure 4:
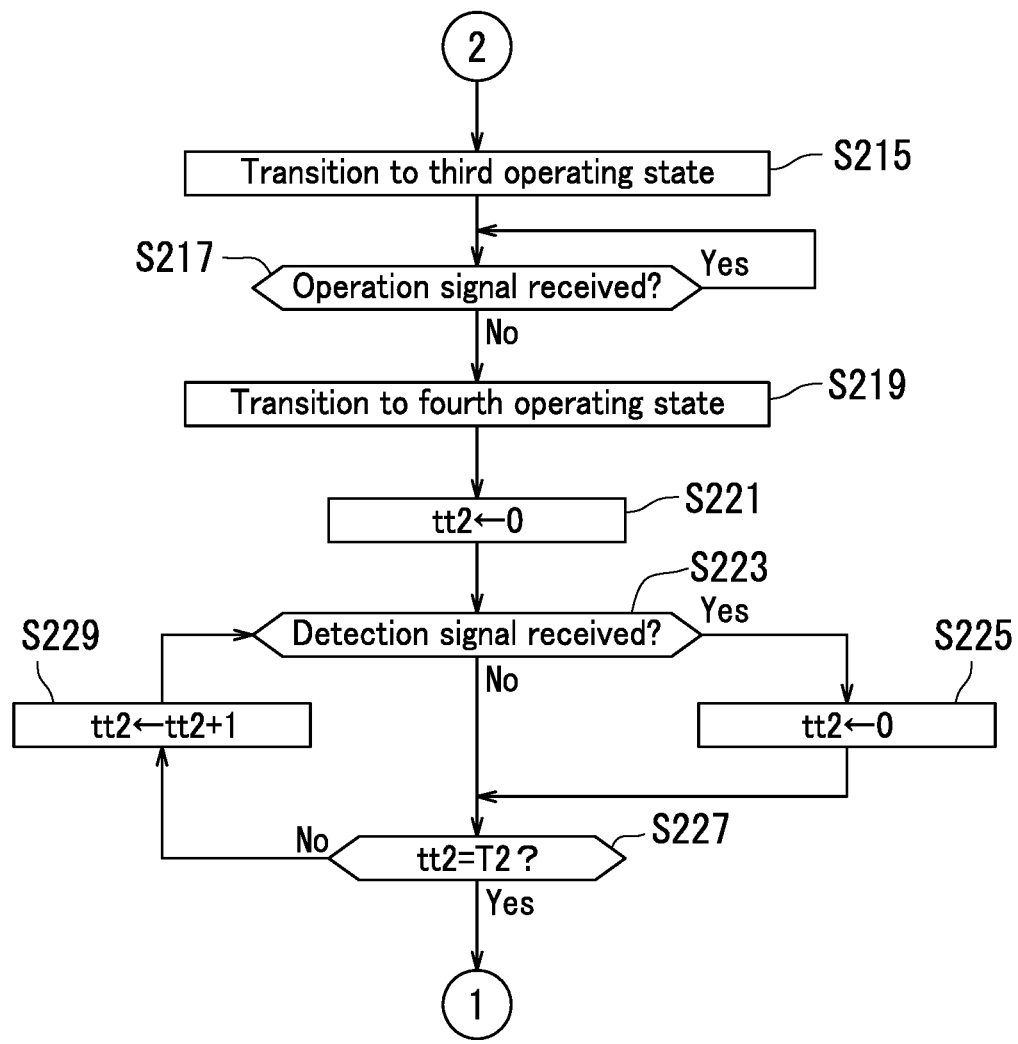
FIG. 4 is as flowchart depicting a process performed by the controller.

The following describes processing in Steps S215 to S229 with reference to FIG. 4.

Step S215: The controller 10 transitions from the second operating state 103 to the third operating state 105.

Step S217: The controller 10 determines presence or absence of the operation signal from the operation section 2. When the operation signal from the operation section 2 is present (Yes in Step S217), the routine remains in Step S217. When the operation signal from the operation section 2 is absent (No in Step S217), the routine proceeds to Step S219.

Step S219: The controller 10 transitions from the third operating state 105 to the fourth operating state 107.

Step S221: The controller 10 resets the second timer tt2 and starts time measurement. In the above configuration, when the second period elapses after the controller 10 receives the operation signal from the operation section 2, the second timer process times out and the controller 10 enters the power saving mode.

Step S223: The controller 10 determines whether or not the detection signal from the motion sensor 11 has been received. When the detection signal from the motion sensor 11 has been received (Yes in Step S223), the routine proceeds to Step S225. When the detection signal from the motion sensor 11 has not been received (No in Step S223), the routine proceeds to Step S227.

Step S225: The controller 10 resets the second timer tt2 and starts time measurement. The second timer tt2 repeats a time measurement start each time the second timer tt2 is reset through the controller 10 receiving the detection signal from the motion sensor 11.

Step S227: The controller 10 determines whether or not the value of the second timer tt2 reaches the second period (elapsed period T2). When the value of the second timer tt2 reaches the second period (Yes in Step S227), the routine returns to Step S201. The second period is for example 300 seconds. When the value of the second timer tt2 does not reach the second period (No in Step S227), the routine proceeds to Step S229.

Step S229: The controller 10 performs counting-up on the second timer tt2, and the routine returns to Step S223.

The following describes Examples 1 to 4 of the present disclosure with reference to FIGS. 2 to 8. Description will be made mainly about operating state transition in the controller 10 and when the detection signal and the operation signal are received.

Example 1

Figure 5:
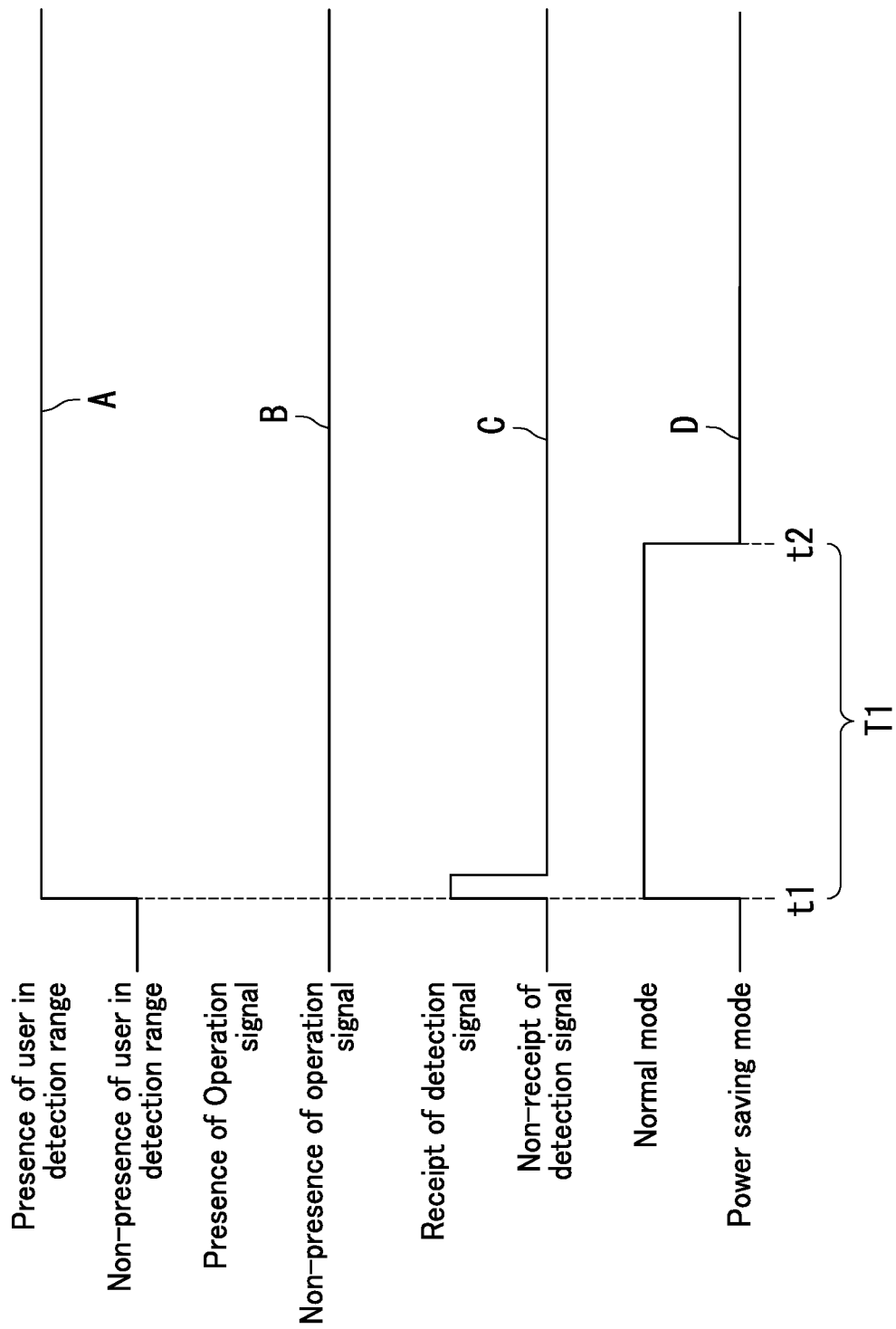
FIG. 5 is a diagram illustrating an example of a detection signal, an operation signal, and electric power states.

The following describes Example 1 of the present disclosure with reference to FIGS. 2 to 5. FIG. 5 is a diagram illustrating an example of the detection signal, the operation signal, and the electric power states. In an example illustrated in FIG. 5, a user is in front of the image forming apparatus 100 but does not operate the image forming apparatus 100.

FIG. 5 illustrates a time chart A, a time chart B, a time chart C, and a time chart D. A horizontal axis for each time chart A to D indicates time. The time chart A indicates whether or not the user is present in the detection range of the motion sensor 11. In the time chart A, High represents presence of a user in the detection range of the motion sensor 11 and Low represents non-presence of the user in the detection range of the motion sensor 11. The time chart B indicates whether or not the controller 10 has received the operation signal. In the time chart B, High represents receipt of the operation signal by the controller 10 and Low represents non-receipt of the operation signal by the controller 10. The time chart C indicates whether or not the controller 10 has received the detection signal. In the time chart C, High represents receipt of the detection signal by the controller 10 and Low represents non-receipt of the detection signal by the controller 10. The time chart D indicates the operating mode of the controller 10. In the time chart D, High represents the controller 10 being in the normal mode and Low represents the controller 10 being in the power saving mode.

The user is present in the detection range of the motion sensor 11 from a time t1. The user does not operate the operation section 2, and therefore, the controller 10 does not receive the operation signal.

Step S201: The controller 10 remains in the first operating state 101 until the time t1.

Step S203: At the time t1 when the user enters the detection range of the motion sensor 11, the motion sensor 11 generates the detection signal and the controller 10 receives the detection signal in the present example. At the time t1, High is indicated in the time chart A, Low is indicated in the time chart B, and High is indicated in the time chart C. The controller 10 determines whether or not the detection signal from the motion sensor 11 has been received. The controller 10 receives the detection signal (Yes in Step S203), and the routine proceeds to Step S205.

Step S205: The controller 10 transitions from the first operating state 101 to the second operating state 103. High is indicated in the time chart D.

Step S207: The controller 10 resets the first timer tt1 to start time measurement.

Step S209: The controller 10 determines presence or absence of the operation signal from the operation section 2. In the absence of the operation signal from the operation section 2 (No in Step S209), Low is indicated in the time chart B. The routine proceeds to Step S211.

Step S211: Since the value of the first timer tt1 does not exceed the elapsed period T1 until a time t2 (=t1+T1) (No in Step S211), the routine proceeds to Step S213.

Step S213: The controller 10 performs counting-up on the first timer tt1 and the routine returns to Step S209.

Step S209: The controller 10 determines presence or absence of the operation signal from the operation section 2. In the absence of the operation signal from the operation section 2 (No in Step S209), the routine proceeds to Step S211.

Step S211: When the value of the first timer tt1 reaches the elapsed period T1 at the time t2 (Yes in Step S211), the first timer process times out and the routine returns to Step S201. The controller 10 transitions from the second operating state 103 to the first operating state 101. At the time t2, High is indicated in the time chart A, Low is indicated in the time chart B, and Low is indicated in the time chart C. Accordingly, the controller 10 is in the power saving mode once the first timer process times out after the controller 10 reverts to the normal mode upon receipt of the detection signal from the motion sensor 11. Low is indicated in the time chart D.

Example 2

Figure 6:
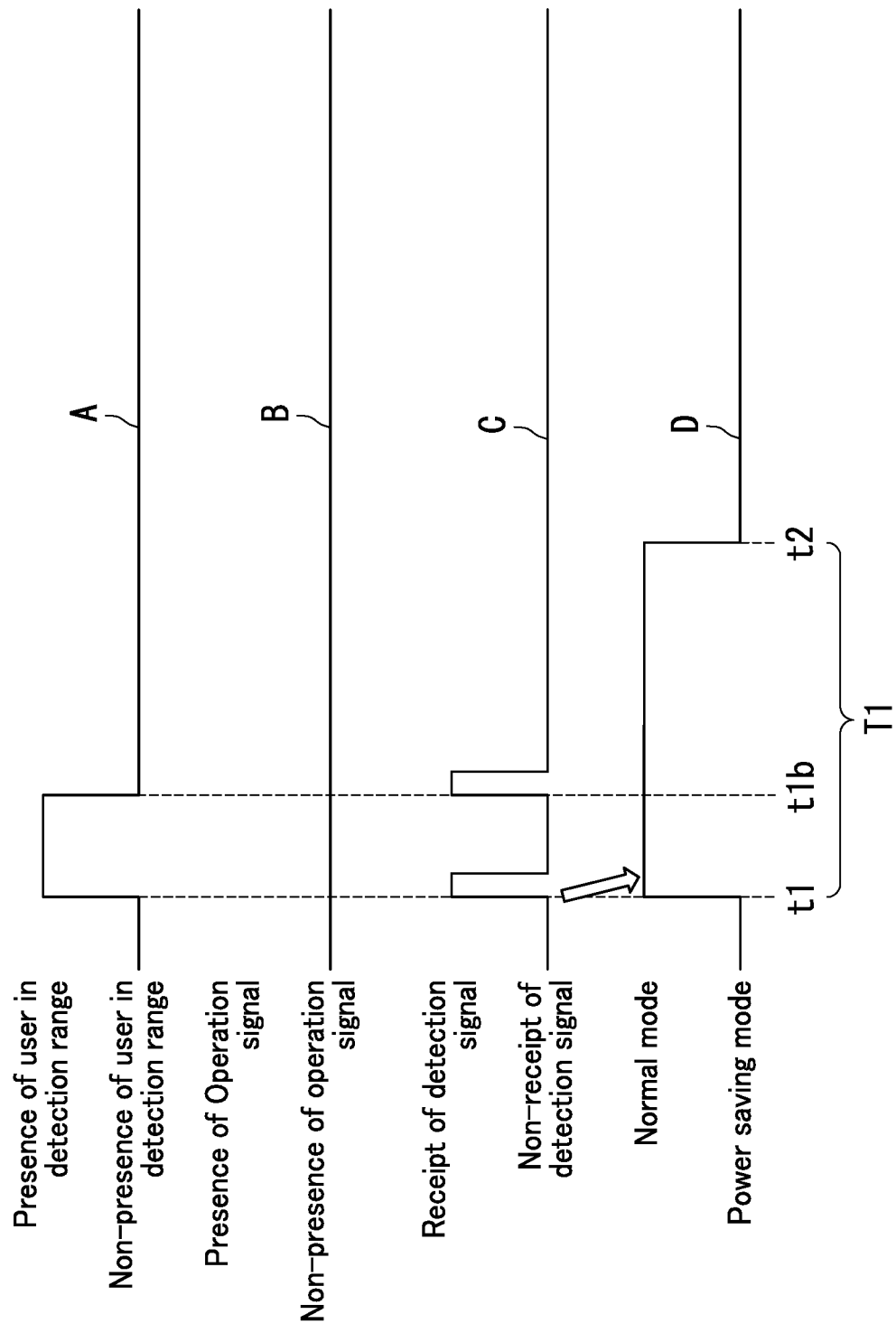
FIG. 6 is a diagram illustrating another example of the detection signal, the operation signal, and the electric power states.

The following describes Example 2 of the present disclosure with reference to FIGS. 2 to 4 and 6. FIG. 6 is a diagram illustrating another example of the detection signal, the operation signal, and the electric power states. In an example illustrated in FIG. 6, a user passes in front of the image forming apparatus 100. The user is present in the detection range of the motion sensor 11 from the time t1 to a time t1b. The user only passes in front of the image forming apparatus 100 and does not operate the image forming apparatus 100. The controller 10 accordingly does not receive the operation signal.

Step S201: The controller 10 remains in the first operating state 101 until the time t1.

Step S203: When the user enters the detection range of the motion sensor 11 at the time t1, the motion sensor 11 generates the detection signal and the controller 10 receives the detection signal. The controller 10 determines whether or not the detection signal from the motion sensor 11 has been received. When the detection signal from the motion sensor 11 has been received (Yes in Step S203), the routine proceeds to Step S205.

Step S205: The controller 10 transitions from the first operating state 101 to the second operating state 103.

Step S207: The controller 10 resets the first timer tt1 to start time measurement.

Step S209: The controller 10 determines presence or absence of the operation signal from the operation section 2. In the absence of the operation signal from the operation section 2 (No in Step S209), Low is indicated in the time chart B. The routine proceeds to Step S211.

Step S211: The value of the first timer tt1 does not reach the elapsed period T1 until the time t2 (=t1+T1) (No in Step S211). The routine accordingly proceeds to Step S213.

Step S213: The controller 10 performs counting-up on the first timer tt1 and the routine proceeds to Step S209.

Step S209: The controller 10 determines presence or absence of the operation signal from the operation section 2. In the absence of the operation signal from the operation section 2 (No in Step S209), the routine proceeds to Step S211.

Step S211: When the value of the first timer tt1 reaches the elapsed period T1 at the time t2 (Yes in Step S211), the first timer process times out and the routine proceeds to Step S201. The controller 10 transitions from the second operating state 103 to the first operating state 101.

During the time when the controller 10 in the second operating state 103 repeats Steps S209 to S213, no influence is exerted on a process even if the controller 10 receives the detection signal in Example 2. Therefore, the controller 10 ignores receipt of the detection signal at the time t1b when the user exits the detection range of the motion sensor 11. The first timer process accordingly does not start. As such, duration of the normal mode is not prolonged.

Example 3

Figure 7:
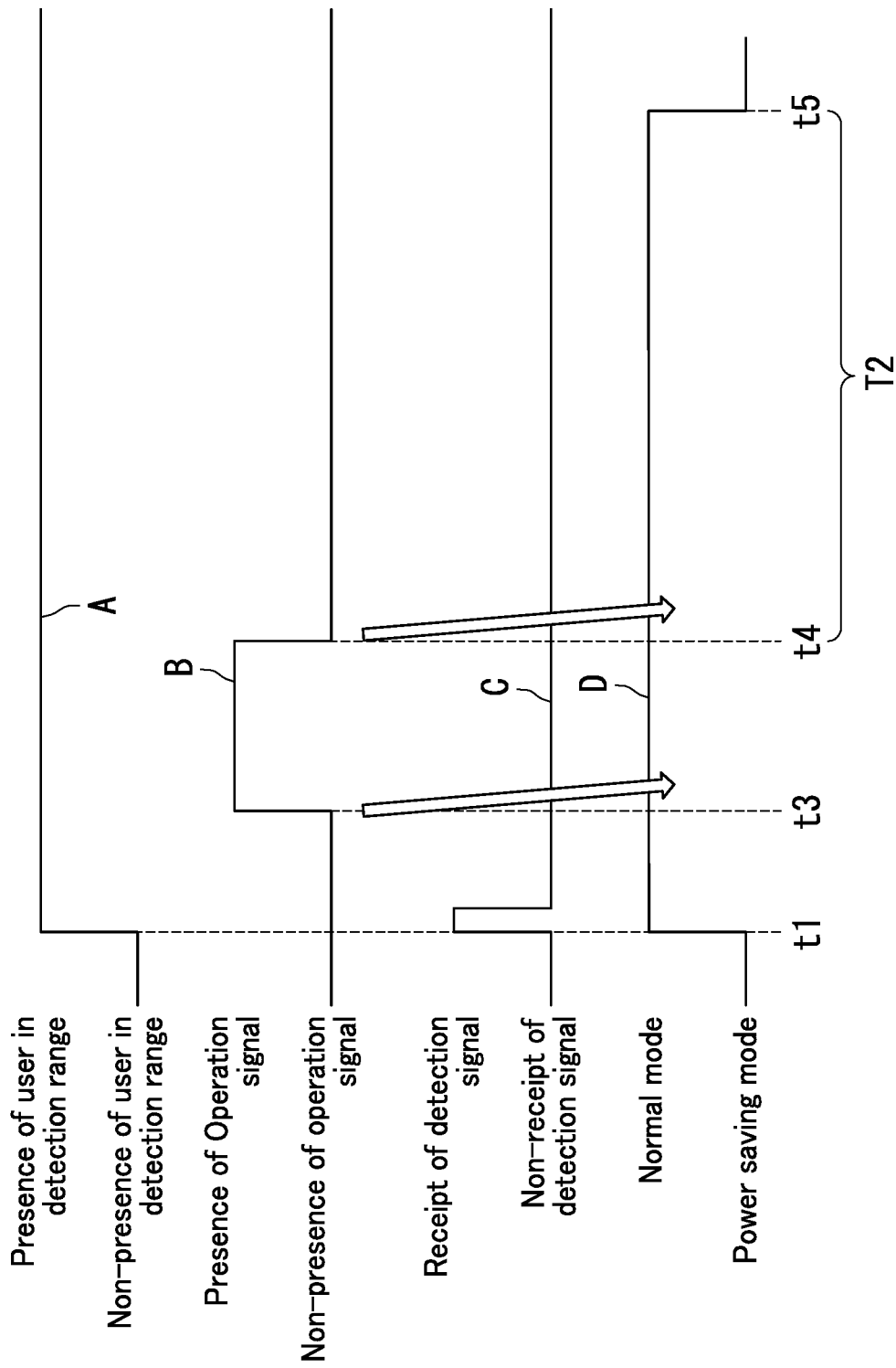
FIG. 7 is a diagram illustrating still another example of the detection signal, the operation signal, and the electric power states.

The following describes Example 3 of the present disclosure with reference to FIGS. 2 to 4 and 7. FIG. 7 is a diagram illustrating another example of the detection signal, the operation signal, and the electric power states. In an example illustrated in FIG. 7, a user is present in front of the image forming apparatus 100 and operates the image forming apparatus 100. The user is in the detection range of the motion sensor 11 from the time t1. The user operates the image forming apparatus 100 during a period between a time t3 to a time t4. The controller 10 accordingly receives the operation signal.

Step S201: The controller 10 remains in the first operating state 101 until the time t1.

Step S203: When the user enters the detection range of the motion sensor 11 at the time t1, the motion sensor 11 generates the detection signal and the controller 10 receives the detection signal. The controller 10 determines whether or not the detection signal from the motion sensor 11 has been received. When the detection signal from the motion sensor 11 has been received (Yes in Step S223), High is indicated in the time charts A and C and the routine proceeds to Step S205.

Step S205: The controller 10 transitions from the first operating state 101 to the second operating state 103. High is indicated in the time chart D.

Step S207: The controller 10 resets the first timer tt1 to start time measurement.

Step S209: The controller 10 determines presence or absence of the operation signal from the operation section 2. In the absence of the operation signal from the operation section 2 (No in Step S209), Low is indicated in the time chart B and the routine proceeds to Step S211.

Step S211: The value of the first timer tt1 does not reach the elapsed period T1 until the time t3 (No in Step S211). The routine accordingly proceeds to Step S213.

Step S213: The controller 10 performs counting-up on the first timer tt1 and the routine returns to Step S209.

Step S209: The controller 10 determines presence or absence of the operation signal from the operation section 2. The operation signal from the operation section 2 is received at the time t3 (Yes in Step S209). The routine accordingly proceeds to Step S215 in FIG. 4. At the time t3, High is indicated in the time chart A, High is indicated in the time chart B, Low is indicated in the time chart C, and High is indicated in the time chart D.

Step S215: The controller 10 transitions to the third operating state 105.

Step S217: The controller 10 determines presence or absence of the operation signal from the operation section 2. In the presence of the operation signal from the operation section 2 until a time t4 (Yes in Step S217), the routine remains in Step S217. In the absence of the operation signal from the operation section 2 at the time t4 (No in Step S217), the routine proceeds to Step S219. At the time t4, High is indicated in the time chart A, Low is indicated in the time chart B, Low is indicated in the time chart C, and High is indicated in the time chart D.

Step S219: The controller 10 transitions to the fourth operating state 107.

Step S221: The controller 10 resets the second timer tt2 to start time measurement.

Step S223: The controller 10 determines whether or not the detection signal from the motion sensor 11 has been received. In the absence of the detection signal from the motion sensor 11 (No in Step S223), the routine proceeds to Step S227.

Step S227: When the value of the second timer tt2 reaches the elapsed period T2 at a time t5 (=t4+T2) (Yes in Step S227), the routine returns to Step S201. The value of the second timer tt2 does not reach the elapsed period T2 until the time t5 (No in Step S227). The routine accordingly proceeds to Step S229.

Step S229: The controller 10 performs counting-up on the second timer tt2 and the routine returns to Step S223. The controller 10 enters the power saving mode once the second timer process times out after the operation signal from the operation section 2 is received.

Example 4

Figure 8:
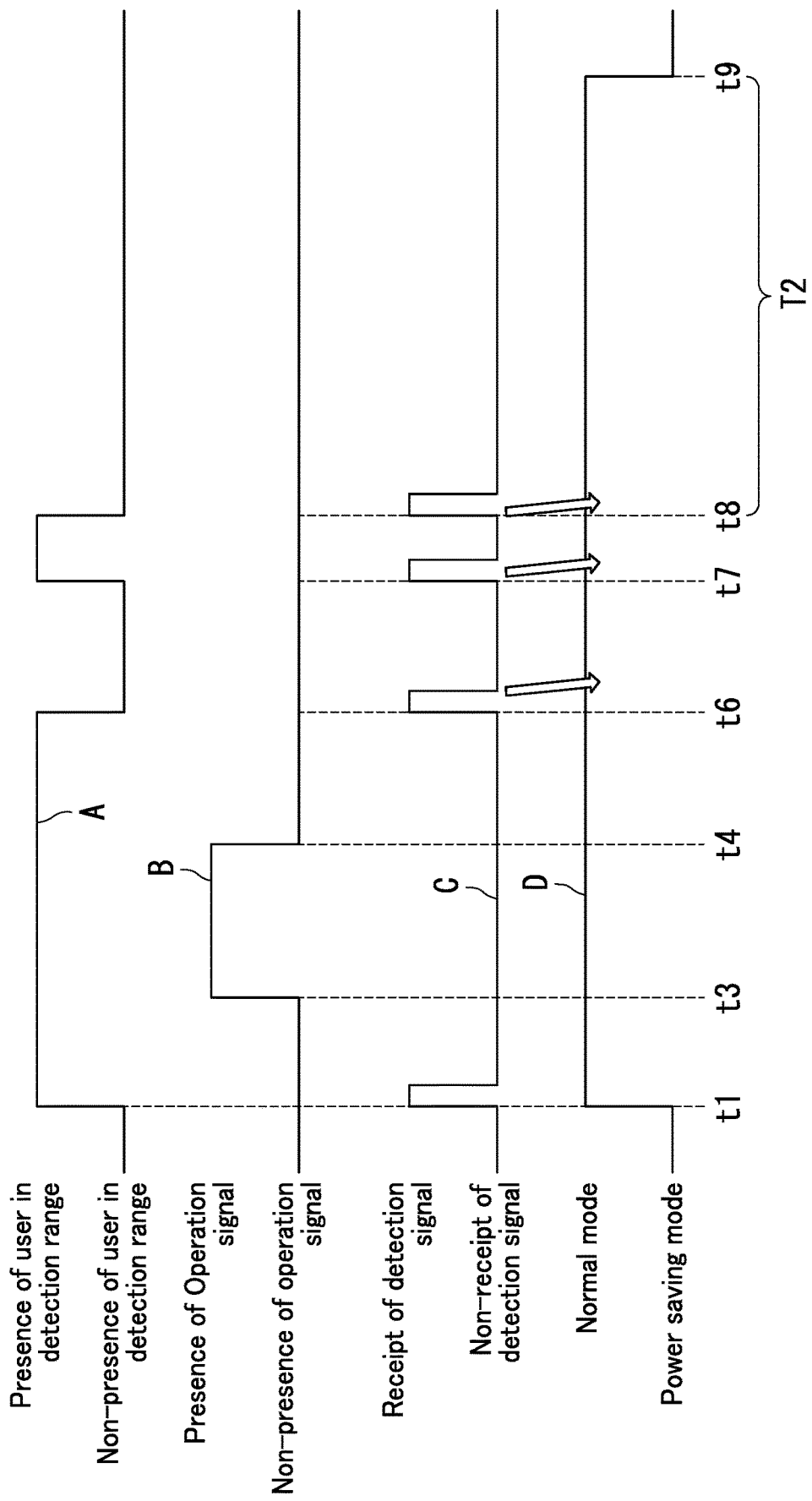
FIG. 8 is a diagram illustrating yet another example of the detection signal, the operation signal, and the electric power states.

The following describes Example 4 of the present disclosure with reference to FIGS. 2 to 4 and 8. FIG. 8 is a diagram illustrating another example of the detection signal, the operation signal, and the electric power states. In an example illustrated in FIG. 8, a user operates the image forming apparatus 100 and then another user passes in front of the image forming apparatus 100. The user is present in the detection range of the motion sensor 11 from the time t1 to a time t6. The user operates the image forming apparatus 100 during a time period between the time t3 and the time t4. The controller 10 accordingly receives the operation signal. In a time period until the second timer tt2 times out after the time t4, the other user passes through the detection range of the motion sensor 11 (time t7 and time t8). The processing from the time t1 to the time t4 is the same as that in Example 3, and therefore, description thereof is omitted.

Step S223: The controller 10 determines whether or not the detection signal from the motion sensor 11 has been received. The detection signal from the motion sensor 11 is received at the time t6, the time t7, and the time t8 (Yes in Step S223). Accordingly, High is indicted in the time chart C and the routine proceeds to Step S225.

The user exits the detection range of the motion sensor 11 at the time t6. Accordingly, Low is indicated in the time chart A, Low is indicated in the time chart B, High is indicated in the time chart C, and High is indicated in the time chart D. The other user enters the detection range of the motion sensor 11 at the time t7. Accordingly, High is indicated in the time chart A, Low is indicated in the time chart B, High is indicated in the time chart C, and High is indicated in the time chart D. The other user exits the detection range of the motion sensor 11 at the time t8. Accordingly, Low is indicated in the time chart A, Low is indicated in the time chart B, High is indicated in the time chart C, and High is indicated in the time chart D.

Step S225: The controller 10 resets the second timer tt2 to start time measurement. In this state, the controller 10 starts the second timer process each time the detection signal from the motion sensor 11 is received. Thus, the duration of the normal mode is prolonged.

Step S227: The value of the second time t2 reaches the elapsed period T2 at a time t9 (=t8+T2) (Yes in Step S227). The routine accordingly returns to Step S201. The value of the second timer tt2 does not reach the elapsed period T2 until the time t9 (No in Step S227). The routine accordingly proceeds to Step S229. At the time t9, Low is indicated in the time chart A, Low is indicated in the time chart B, Low is indicated in the time chart C, and Low is indicated in the time chart D.

Examples 3 and 4 describe examples in which the controller 10 stops executing the first timer process in response to receipt of the operation signal upon the user operating the operation section 2. However, the present disclosure is not limited to the above examples.

FIG. 9 is a diagram illustrating a relationship between operation events and first timer process stoppage. The controller 10 distinguishes between an operation signal relevant to first timer process stoppage and an operation signal not relevant to first timer process stoppage. The storage 9 stores therein the relationship between the operation events and the first timer process stop as relevant information. The controller 10 determines whether or not to stop executing the first timer process based on content indicated by the operation signal. Specifically, the controller 10 reads out the relevant information stored in the storage 9 and determines whether or not to stop executing the first timer process based on the relevant information. For example, in response to receipt of an operation event of pressing a key of the operation section 2 or touching the touch panel 21 thereof, the first timer tt1 is stopped. By contrast, in response to receipt of an operation event of inserting USB memory into the image forming apparatus 100 or attachment or detachment of the sheet feed section 3, the first timer tt1 is not stopped. As such, the controller 10 can determine to or not to stop the first timer tt1 according to an operation event.

The image forming apparatus 100 according to the present disclosure has been described so far with reference to the drawings (FIGS. 1 to 9). However, the present disclosure is not limited to the above embodiment and may be implemented in various different forms within a scope that does not deviate from the essence of the present disclosure.

Configuration and values described in the above embodiment are merely examples and are not intended as specific limitations. Various alterations may be made so long as there is no substantial deviation from the effects of the present disclosures.

An example in which the present disclosure is applied to the image forming apparatus 100 which forms monochrome images is described in the present embodiment. However, the present disclosure is applicable to for example a color image forming apparatus.

An example in which the present disclosure is applied to the image forming apparatus 100 which performs image formation by electrography is described in the present embodiment. However, the present disclosure is applicable to for example an inkjet recording apparatus.

What is claimed is:

1. An image forming apparatus that operates in a normal mode in a first electric power state and a power saving mode in a second electric power state, more electric power being saved in the second electric power than in the first electric power state, the image forming apparatus comprising:
   a sensor configured to detect a detection target to generate a detection signal indicating detection of the detection target;
   an operation section configured to receive an operation from the detection target to generate an operation signal indicating content of the operation from the detection target; and
   a controller configured to execute a first timer process in response to receipt of the detection signal from the sensor and execute a second timer process in response to receipt of the operation signal from the operation section, wherein
   the first timer process is a process of measuring an elapsed period from receipt of the detection signal from the sensor by the controller,
   the second timer process is a process of measuring an elapsed period from stoppage of receipt of the operation signal from the operation section by the controller,
   at a time when a first period elapses indicating that the first timer process times out, the controller transitions from the normal mode to the power saving mode,
   at a time when a second period elapses indicating that the second timer process times out, the controller transitions from the normal mode to the power saving mode,
   the controller transitions between the normal mode and the power saving mode based on the first timer process and the second timer process, and
   the first period is shorter than the second period.

2. An image forming apparatus that operates in a normal mode in a first electric power state and a power saving mode in a second electric power state, more electric power being saved in the second electric power than in the first electric power state, the image forming apparatus comprising:
   a sensor configured to detect a detection target to generate a detection signal indicating detection of the detection target;
   an operation section configured to receive an operation from the detection target to generate an operation signal indicating content of the operation from the detection target; and
   a controller configured to execute a first timer process in response to receipt of the detection signal from the sensor and execute a second timer process in response to receipt of the operation signal from the operation section, wherein
   the first timer process is a process of measuring an elapsed period from receipt of the detection signal from the sensor by the controller,
   the second timer process is a process of measuring an elapsed period from stoppage of receipt of the operation signal from the operation section by the controller,
   at a time when a first period elapses indicating that the first timer process times out, the controller transitions from the normal mode to the power saving mode,
   at a time when a second period elapses indicating that the second timer process times out, the controller transitions from the normal mode to the power saving mode,
   in a state in which the controller is in the power saving mode, the controller transitions from the power saving mode to the normal mode upon receiving the detection signal from the sensor and starts executing the first timer process, and
   the first period is shorter than the second period.

3. An image forming apparatus that operates in a normal mode in a first electric power state and a power saving mode in a second electric power state, more electric power being saved in the second electric power than in the first electric power state, the image forming apparatus comprising:
   a sensor configured to detect a detection target to generate a detection signal indicating detection of the detection target;
   an operation section configured to receive an operation from the detection target to generate an operation signal indicating content of the operation from the detection target; and
   a controller configured to execute a first timer process in response to receipt of the detection signal from the sensor and execute a second timer process in response to receipt of the operation signal from the operation section, wherein
   the first timer process is a process of measuring an elapsed period from receipt of the detection signal from the sensor by the controller,
   the second timer process is a process of measuring an elapsed period from stoppage of receipt of the operation signal from the operation section by the controller,
   at a time when a first period elapses indicating that the first timer process times out, the controller transitions from the normal mode to the power saving mode,
   at a time when a second period elapses indicating that the second timer process times out, the controller transitions from the normal mode to the power saving mode,
   in a state in which the controller is in the normal mode, the controller does not reset the elapsed period measured in the first timer process even upon receiving the detection signal, and
   the first period is shorter than the second period.

4. An image forming apparatus that operates in a normal mode in a first electric power state and a power saving mode in a second electric power state, more electric power being saved in the second electric power than in the first electric power state, the image forming apparatus comprising:
   a sensor configured to detect a detection target to generate a detection signal indicating detection of the detection target;
   an operation section configured to receive an operation from the detection target to generate an operation signal indicating content of the operation from the detection target; and
   a controller configured to execute a first timer process in response to receipt of the detection signal from the sensor and execute a second timer process in response to receipt of the operation signal from the operation section, wherein the first timer process is a process of measuring an elapsed period from receipt of the detection signal from the sensor by the controller, the second timer process is a process of measuring an elapsed period from stoppage of receipt of the operation signal from the operation section by the controller, at a time when a first period elapses indicating that the first timer process times out, the controller transitions from the normal mode to the power saving mode, at a time when a second period elapses indicating that the second timer process times out, the controller transitions from the normal mode to the power saving mode, in a state in which the controller is in the normal mode, the controller stops executing the first timer process upon receiving the operation signal from the operation section, when the controller stops receiving the operation signal from the operation section, the controller starts executing the second timer process, and the first period is shorter than the second period.

5. An image forming apparatus that operates in a normal mode in a first electric power state and a power saving mode in a second electric power state, more electric power being saved in the second electric power than in the first electric power state, the image forming apparatus comprising:

a sensor configured to detect a detection target to generate a detection signal indicating detection of the detection target;

an operation section configured to receive an operation from the detection target to generate an operation signal indicating content of the operation from the detection target; and a controller configured to execute a first timer process in response to receipt of the detection signal from the sensor and execute a second timer process in response to receipt of the operation signal from the operation section, wherein the first timer process is a process of measuring an elapsed period from receipt of the detection signal from the sensor by the controller, the second timer process is a process of measuring an elapsed period from stoppage of receipt of the operation signal from the operation section by the controller, at a time when a first period elapses indicating that the first timer process times out, the controller transitions from the normal mode to the power saving mode, at a time when a second period elapses indicating that the second timer process times out, the controller transitions from the normal mode to the power saving mode, in a state in which the controller is in the normal mode, the controller resets the elapsed period measured in the second timer process upon receiving the detection signal from the sensor and then starts executing the second timer process, and the first period is shorter than the second period.

6. An image forming apparatus that operates in a normal mode in a first electric power state and a power saving mode in a second electric power state, more electric power being saved in the second electric power than in the first electric power state, the image forming apparatus comprising:

a sensor configured to detect a detection target to generate a detection signal indicating detection of the detection target;

an operation section configured to receive an operation from the detection target to generate an operation signal indicating content of the operation from the detection target; and a controller configured to execute a first timer process in response to receipt of the detection signal from the sensor and execute a second timer process in response to receipt of the operation signal from the operation section, wherein the first timer process is a process of measuring an elapsed period from receipt of the detection signal from the sensor by the controller, the second timer process is a process of measuring an elapsed period from stoppage of receipt of the operation signal from the operation section by the controller, at a time when a first period elapses indicating that the first timer process times out, the controller transitions from the normal mode to the power saving mode, at a time when a second period elapses indicating that the second timer process times out, the controller transitions from the normal mode to the power saving mode, the controller determines whether or not to stop executing the first timer process based on the content indicated by the operation signal, and the first period is shorter than the second period.

* * * * *